(12) United States Patent
Szczech et al.

(10) Patent No.: US 6,397,425 B1
(45) Date of Patent: Jun. 4, 2002

(54) POLYPROPYLENE BRUSH BODY

(75) Inventors: Gerald S. Szczech; Jeffrey S. Lewenczuk, both of Iowa City, IA (US)

(73) Assignee: Gillette Canada Company, Mississauga (CA)

( * ) Notice: Subject to any disclaimer, the term of this patent is extended or adjusted under 35 U.S.C. 154(b) by 0 days.

(21) Appl. No.: 09/385,578

(22) Filed: Aug. 31, 1999

(51) Int. Cl.$^7$ ................................................. A46B 9/04
(52) U.S. Cl. ..................................... 15/167.1; 15/143.1
(58) Field of Search ............................... 15/167.1, 143.1

(56) References Cited

U.S. PATENT DOCUMENTS

| | | |
|---|---|---|
| 4,691,404 A | 9/1987 | Tarrson et al. |
| 5,241,031 A | 8/1993 | Mehta |
| 5,266,392 A | 11/1993 | Land et al. |
| 5,340,581 A * | 8/1994 | Tseng et al. ................ 15/167.1 |
| 5,398,369 A * | 3/1995 | Heinzelman et al. |
| 5,476,914 A | 12/1995 | Ewen et al. |
| 5,633,083 A | 5/1997 | Iwai et al. |
| 5,651,158 A * | 7/1997 | Halm ........................ 15/167.1 |
| 5,714,547 A | 2/1998 | Li et al. |
| 5,747,592 A | 5/1998 | Huff et al. |
| 5,758,383 A | 6/1998 | Hohlbein |
| 5,774,923 A * | 7/1998 | Halm ........................ 15/167.1 |
| 5,797,158 A | 8/1998 | Hoshizaki et al. |
| 5,813,079 A * | 9/1998 | Halm ........................ 15/167.1 |
| 5,836,769 A | 11/1998 | Spencer |
| 5,970,564 A * | 10/1999 | Inns et al. .................. 15/167.1 |
| 6,076,223 A * | 6/2000 | Dair et al. .................. 15/167.1 |
| 6,138,315 A * | 10/2000 | Schmitt et al. ............. 15/167.1 |

FOREIGN PATENT DOCUMENTS

EP 0924062 A2 6/1999

OTHER PUBLICATIONS

Rifi, et al., "Flexomer™ Polyolefins: A Bridge Between Polyethylene and Rubbers," 1990, pp. 1–7.
Ficker, et al., "Fluidized–Bed, Ethylene–Alpha Olefin Interpolymers (Flexomer™ Polyolefins) As Modifiers for Polypropylene," Oct. 8–11, Detriot, Michigan, 17 pages.
Fina Oil & Chemical Company, "An Introduction to Fina," circa 1996, 21 pages.
ASTM, Standard Test Method for Flow Rates of Thermoplastics by Extrusion Plastometer, Jan. 1996, pp. 1–9.
Fina Oil & Chemical Company, "FINA® Polypropylene, 3825," Jun. 1996, 1 page.
Fina Oil & Chemical Company, "FINA® Polypropylene 3824," Jun. 1996, 1 page.
Exxon Chemical, "ESCORENE® Polypropylene, PP 1024," A General Purpose Homopolymer, Sep. 1996, 1 page.
Exxon Chemical "ESCORENE® Polypropylene, PP 1105, Controlled Rheology Injection Molding Resin," Sep. 1996, 1 page.
Exxon Chemical, "Exxon Chemical Polypropylene Capabilities," Apr. 7, 1997, 13 pages.
Ferry et al., "Exxon Chemical Company Polypropylene Overview, Presented to Oral B Corporation," May 20, 1997, 15 pages.
Dow Chemical U.S.A., "Technical Data Sheet H702–35N, Polypropylene Homopolymer Resin," Feb. 20, 1998, 1 page.
Union Carbide, "Flexomer® Polyolefin DFDB–1085 Natural", before Aug. 31, 1998, 2 pages.
Exxon Chemical, "ESCORENE Polypropylene, PP 1074, A General Purpose Injection Molding Resin," before Aug. 31, 1998, 1 page.
Exxon Chemical "ESCORENE® Polypropylene, PP 1154, A Controlled Rheology Homopolymer," before Aug. 31, 1998, 1 page.

* cited by examiner

Primary Examiner—Terrence R. Till
(74) Attorney, Agent, or Firm—David A. Howley

(57) ABSTRACT

An oral brush includes a) a body that includes a polymer composition that includes polypropylene and has a melt flow rate of at least about 10 g/10 min, and b) bristles extending from the body.

15 Claims, 3 Drawing Sheets

Figure 3:
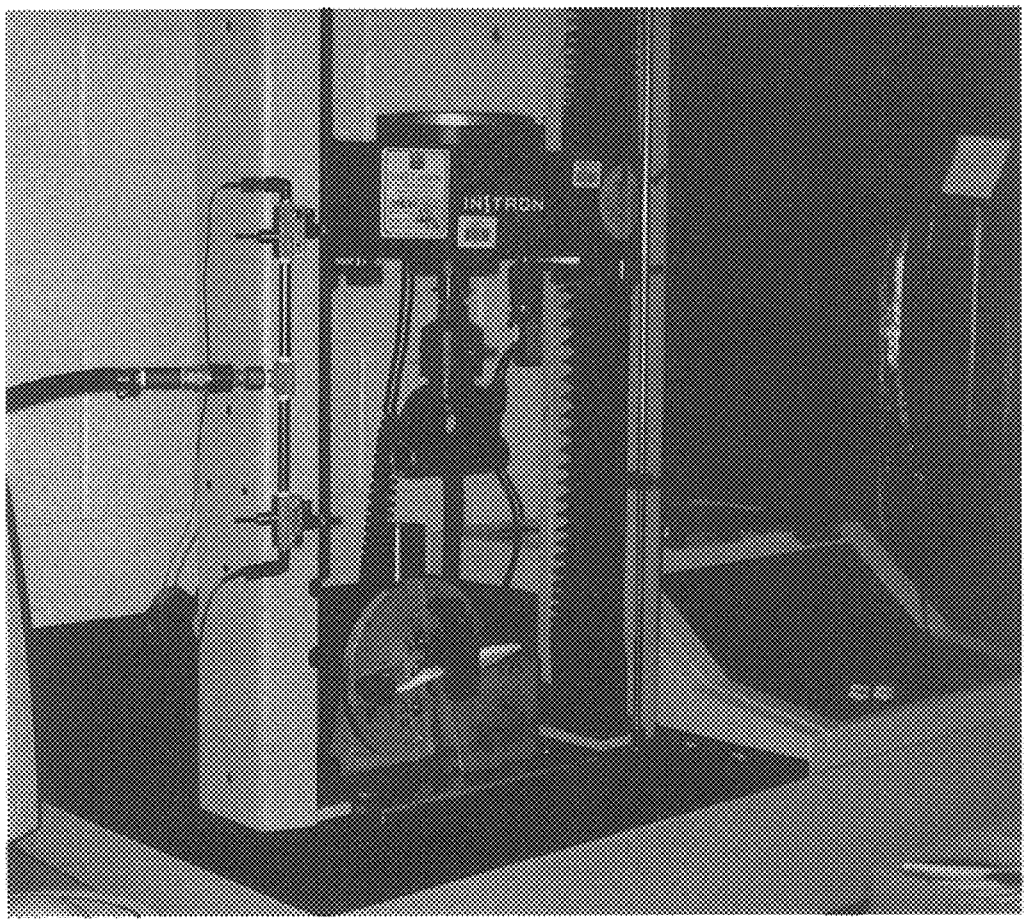

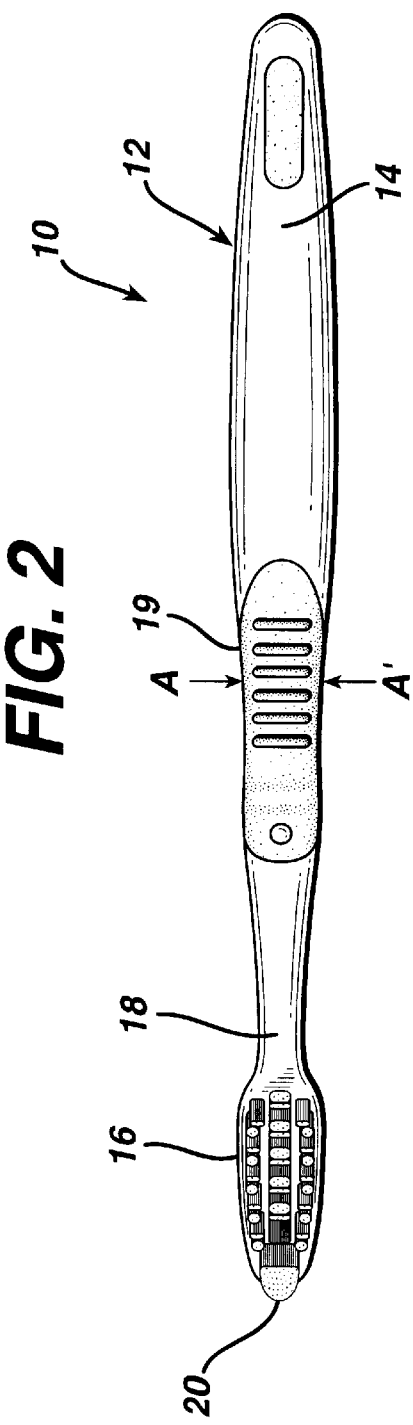
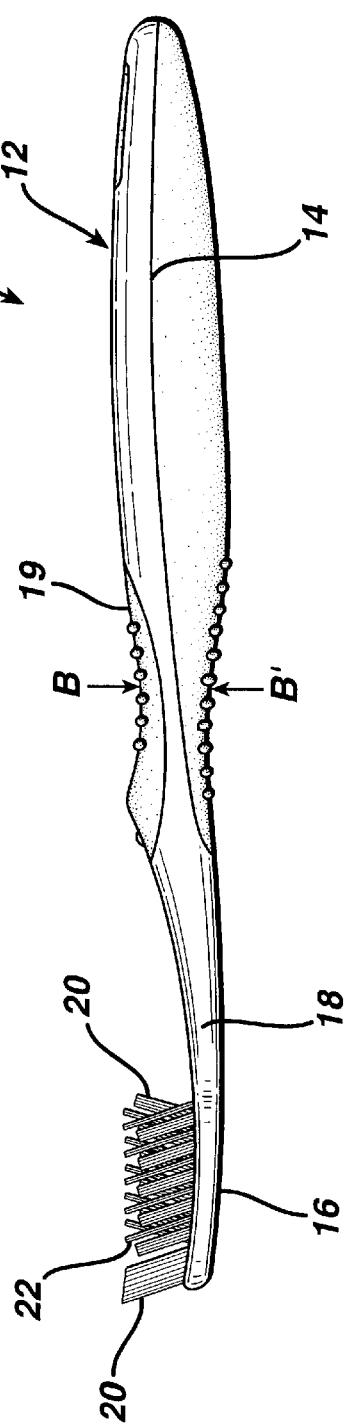

POLYPROPYLENE BRUSH BODY

BACKGROUND OF THE INVENTION

The invention relates to polypropylene brush bodies.

A toothbrush generally includes a body having a handle portion, a head portion and bristles extending from the head portion. The bristles can be arranged in the form of tufts. A toothbrush is constructed to withstand the normal pressures exerted upon the brush during brushing of teeth and other surfaces of the oral cavity.

Toothbrushes have been manufactured by injecting a liquid polymeric composition, e.g., polypropylene, into a mold cavity that defines a toothbrush body, whereupon the polymer composition hardens (i.e., freezes) in the form of the body of the toothbrush, e.g., the handle and head of the brush. For two component toothbrush bodies, the body of the toothbrush is then transferred to a second mold cavity and a second liquid polymer composition, e.g., an elastomer, is injected into the second mold cavity to form a second portion of the brush body, e.g., the gripping member.

The amount of time that it takes the liquid polymer composition to harden in the mold cavity is referred to as the "set time". The "set time" influences the rate toothbrushes can be manufactured.

SUMMARY OF THE INVENTION

In one aspect, the invention features an oral brush that includes a body that includes a) a polymer composition that includes polypropylene and that has a melt flow rate of at least about 10 g/10 min, and b) a bristle extending from the body. In some embodiments, the body has a tensile strength of at least about 3100 psi. In other embodiments, the body has a tensile strength of at least about 3700 psi. The body can have a tensile strength of from about 3700 psi to about 6,000 psi.

In one embodiment, the body defines a shape that includes a handle and a head extending from said handle, where the handle includes a thumb grip having a cross-sectional area no greater than about 1.8 $cm^2$. In other embodiments, the body defines a shape that includes a handle and a head extending from said handle, said handle having a cross-sectional area no greater than about 1 $cm^2$.

In another embodiment, the polymer composition has a melt flow rate of from about 10 g/10 min to about 40 g/10 min. In some embodiments, the polymer composition has a melt flow rate of from about 15 g/10 min to about 30 g/10 min. In still other embodiments, the polypropylene has a melt flow rate of in the range of from about 30 g/10 min to about 40 g/10 min.

In one embodiment, the polypropylene has a tensile strength of from about 4000 psi to about 6000 psi.

In other embodiments, the polymer composition further includes a plastomer. In one embodiment, the plastomer has a melt flow rate of from about 1.3 g/10 min to about 5.2 g/10 min. The plastomer can have a tensile strength of from about 1500 to about 3100 psi. In some embodiments, the plastomer includes a copolymer that includes ethylene and a polyalpha-olefin. The polymer composition can include from about 2% by weight to about 30% by weight plastomer. In other embodiments, the polymer composition includes from about 10% by weight to about 20% by weight plastomer. In another embodiment, the polymer composition includes from about 75% by weight to about 90% by weight polypropylene, and from about 10% by weight to about 25% by weight of plastomer.

In another aspect, the invention features a process of manufacturing an oral brush body that includes injecting a polymer composition having a melt flow rate of at least 10 g/10 min into a mold cavity to form a body of the oral brush. In one embodiment the polymer composition includes polypropylene. In another embodiment, the polymer composition includes a plastomer. In other embodiments, the polymer composition further includes at least about 10% by weight of a plastomer. In another embodiment, the polymer composition includes polypropylene and a plastomer.

In one embodiment, the process further includes preparing the polymer composition by combining from about 75% by weight to about 90% by weight plastomer and from about 10% by weight to about 25% by weight polypropylene.

In other aspects, the invention features a process of manufacturing an oral brush that includes injecting a polymer composition having a melt flow rate of at least about 10 g/10 min into a mold cavity defining at least a portion of an oral brush body, the mold cavity that includes a plurality of bristles.

The oral brushes of the present invention are flexible and do not break when brushing forces are exerted gas on the head portion of the brush. In particular, the oral brushes do not break when flexed in a forward direction or a reverse direction. The brushes can also be returned to their original form after having been bent with this force.

The present invention enables the manufacture of brush bodies having relatively narrow regions that exhibit excellent resistance to breakage and remain flexible, yet are sufficiently rigid so as to provide a structure suitable for its intended purpose. In addition, because the brush bodies can be molded rapidly due to the minimal set time in the injection molding operation, excellent rates of production and manufacturing efficiencies are achieved.

Other features and advantages of the invention will become apparent from the following description of the preferred embodiments thereof, and from the claims.

BRIEF DESCRIPTION OF THE DRAWING

FIG. 1 is a side view of a toothbrush.

FIG. 2 is a top view of the toothbrush of FIG. 1.

FIG. 3 is a photograph of a toothbrush positioned in a test fixture of an Instron test apparatus taken from the front side of the Instron test apparatus.

FIG. 4 is a photograph of the front of the Instron test apparatus of FIG. 3.

DETAILED DESCRIPTION

Referring to FIG. 1, toothbrush 10 includes a body 12 that includes a handle 14, a head 16, a neck 18 between the handle and the head 16 and a thumb grip 19. Tufts 20, which include at least one bristle 22, extend from head 16 of body 12. The body can include a base, e.g., made from a relatively harder, more rigid plastic such as polypropylene, and a grip, e.g., made from a relatively rubbery material such as, e.g., styrene-ethylene-butadiene-styrene block copolymer.

The toothbrush body exhibits a tensile strength of at least about 3100 psi, more preferably from about 3700 psi to about 6000 psi as measured according to ASTM D638. At least a portion of the toothbrush body (e.g., the base) includes a polymer composition that exhibits a melt flow rate of at least about 10 g/10 min, preferably from about 10 g/10 min to about 40 g/10 min, more preferably from about 12 g/10 min to about 35 g/10 min, most preferably from about 15 g/10 min to about 30 g/10 min as measured according to ASTM D1238-95. In some embodiments, at least a portion of the toothbrush body includes a polymer composition that exhibits a melt flow rate of from about 30 g/10 min to about 40 g/10 min.

The toothbrush body is sufficiently stiff such that it can be bent without breaking. A number of properties of the brush, when taken in combination, provide a picture of the ability of the brush body to bend, yet resist breakage.

One property is the maximum displacement exhibited by the brush body in the forward and reverse directions. The maximum displacement is the maximum distance the specimen deflected during the test. Preferably, the brush body exhibits a forward maximum displacement of at least 3 inch, and a reverse maximum displacement of at least about 2.7 in. when measured according to the Maximum Displacement Test Method below.

A second property is the stiffness of the brush body, which can be measured by the amount of forward and reverse maximum load a brush body can withstand. The forward maximum load refers to the maximum amount of force applied to the brush body from the bristle surface of the brush body. Preferably the brush exhibits a forward maximum load to break of at least about 8.0 lbs of force, more preferably from about 9.0 lbs of force to about 12.0 lbs of force, and a reverse maximum load to break of at least about 8.0 lbs of force, more preferably from about 8.0 lbs of force to about 11.0 lbs of force when measured according to the Maximum Load Test Method below.

A third property of the brush is energy to break the brush body as tested in forward and reverse directions. Preferably the brush body exhibits a forward maximum energy to break of at least about 21 lbs-in, more preferably at least about 23 lbs-in, and a reverse maximum energy to break of at least about 23 lbs-in, when measured according to the Energy to Break Test Method set forth below.

A fourth property is the toughness of the brush body in the forward and reverse directions. Preferably the brush body exhibits a toughness of at least about 40 in-lbs/in$^3$, more preferably at least about 44 in-lbs/in$^3$, in the forward direction and a toughness of at least about 40 in-lbs/in$^3$, more preferably at least about 45 in-lbs/in$^3$, in the reverse direction when calculated according to the Toughness Test Method set forth below.

The above properties preferably exist in toothbrush bodies in which the thumb grip region of the toothbrush body has a cross-sectional area no greater than 1.8 cm$^2$, preferably no greater than 1.1 cm$^2$, most preferably no greater than 1 cm$^2$.

The polymer composition of the toothbrush body includes polypropylene. Polypropylene exists in a variety of forms, each of which exhibits a variety of properties. Preferably the body includes a polypropylene known as a controlled rheology polypropylene, and has a melt flow rate of no greater than 40 g/10 min, more preferably no greater than 30 g/10 min, and a tensile strength of at least about 3100 psi, more preferably from about 4,000 psi and 6,000 psi, most preferably at least about 4,700 psi.

Preferably the polypropylene is formulated to harden rapidly after being injected into a mold cavity. The ability to harden is referred to as "set time." Preferably the set time is sufficiently short so as to permit maximum utilization of the injection molding equipment.

Preferred polypropylene is at least about 97% isotactic polypropylene. Suitable polypropylene is available under the trade designations FINA 3824 and FINA 3825 from Fina Oil and Chemical Company (Dallas, Tex.), and PP1105 from Exxon Chemical (Houston, Tex.).

The polymer composition can include up to 100% by weight polypropylene. Preferably the polypropylene is present in the polymer composition in an amount of from about 75% by weight to about 90% by weight, most preferably about 85% by weight. The polypropylene preferably has a narrow molecular weight range.

The polypropylene also includes a catalyst that controls the length of the polymer chain so as to produce a narrow molecular weight range of polymer. This is referred to as a controlled rheology polypropylene. Preferred catalysts also promote rapid hardening of the polypropylene after it has been injected into a mold cavity. Examples of useful catalysts include Ziegler-Natta catalysts, and Ziegler-Natta-type catalysts.

The polymer composition of the toothbrush body can also include a plastomer. Plastomers have properties that are generally intermediate to those of thermoplastic materials and elastomeric materials. Preferably the plastomer modifies the impact properties (i.e., the reaction to a force) of the polypropylene and toothbrush bodies made therefrom. Preferred plastomers exhibit a melt flow rate of from about 1 g/10 min to about 5 g/10 min, more preferably from about 1.3 g/10 min to about 5.2 g/10 min, and a tensile strength of from about 1500 psi to about 3000 psi, more preferably about 2500 psi.

Examples of useful plastomers include copolymers of ethylene and alpha-olefins, e.g., $C_3$ to $C_{20}$ alpha-olefin. suitable commercial plastomers are available under the trade designation Exact 4033 from Exxon Chemical.

When plastomer is present in the polymer composition of the toothbrush body, it is present in an amount of at least about 2% by weight, preferably from about 2% by weight to about 30% by weight, more preferably from about 10% by weight to about 25% by weight, most preferably about 15% by weight based on the weight of the polymer composition.

The polymer composition of the toothbrush body may also include an ethylene-alpha olefin interpolymer. Preferred ethylene-alpha olefin interpolymers exhibit a melt flow rate of from about 1 g/10 min to about 5 g/10 min, more preferably about 5 g/10 min, and a tensile strength of from about 1500 psi to about 3000 psi, more preferably about 1700 psi. Examples of commercially available ethylene-alpha olefin interpolymers are available under the PLEXOMER trade designation from Union Carbide (Danbury, Conn.), e.g., FLEXOMER POLYOLEFIN DFDB-1085 Natural.

When an ethylene-alpha olefin interpolymer is present in the polymer composition of the toothbrush body, it is present in an amount of at least about 2% by weight, preferably from about 2% by weight to about 30% by weight, more preferably from about 10% by weight to about 25% by weight, most preferably about 15% by weight based on the weight of the polymer composition.

Preferably the portion of the toothbrush body that includes the polymer composition is stable to ultraviolet (UV) light such that the body is free from discoloration due light over the useful life of the toothbrush.

The polymer composition of the toothbrush body can also include a variety of other components including calcium carbonate, antioxidant, pigment (e.g., titanium dioxide), dye, UV brighteners, and combinations thereof.

The invention will now be described further by way of the following examples.

EXAMPLES

Test Procedures

Test procedures used in the examples include the following.

Maximum Displacement

Maximum displacement in the forward and reverse direction is determined as follows.

The width and thickness of the brush body at the thumb grip of the brush body is measured and recorded. The thumb grip is the fulcrum, or point about which the free portion of the brush body rotates when a force is applied to the brush body by the Instron test apparatus. The width of the brush body (the width as determined from the top view (i.e., bristle surface) see FIG. 2) at the fulcrum of the brush body (e.g., along line A–A') is measured and recorded. The thickness of the brush body as viewed from the side of the brush body (see FIG. 1) is measured at the fulcrum (e.g., along line B–B') and recorded. The width and thickness values are input into an Instron Model 4301 test apparatus (Instron, Canton, Mass.).

Figure 4:
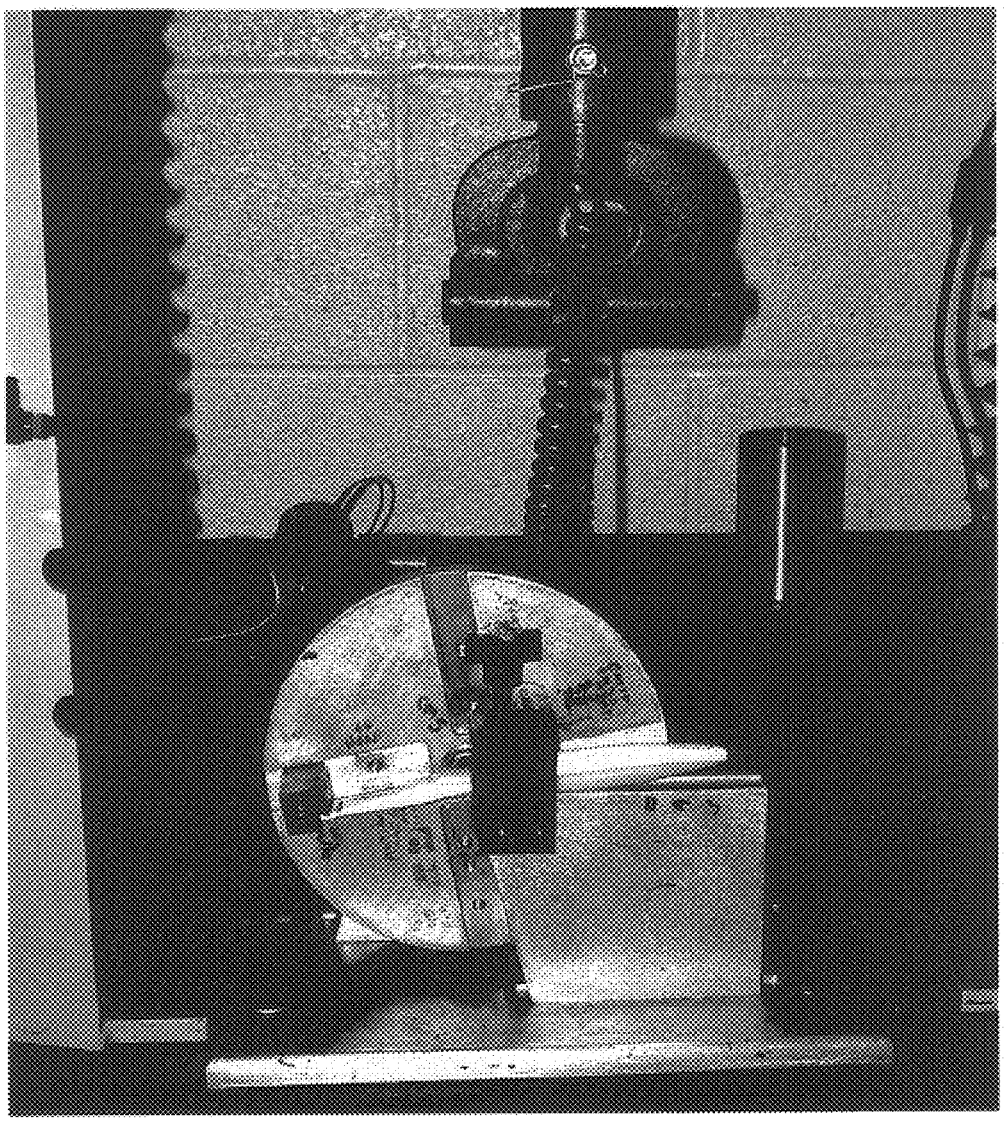

The handle of the brush body is inserted in the Instron test fixture, which is attached to the Instron test apparatus, as shown in FIGS. 3 and 4. To measure maximum displacement in the forward direction the handle is inserted into the test fixture such that the bristles face upward in the direction of the load to be applied. To measure maximum displacement in the reverse direction the handle is inserted into the test fixture such that the bristles face downward, away from the load to be applied.

The handle backstop is adjusted such that the distance from the front edge of the test fixture to the tip of the brush head is 61 mm. The tip of the brush body is centered directly beneath the load cell, as shown in FIG. 3. A force is applied in a perpendicular direction to the longitudinal direction of the brush body at a cross-head speed of 0.5 in/min. The initial settings on the Instron test apparatus are as followings: initial load –0.5 lbs and initial extension –0.125. The Instron test cycle is then run. A force is applied to the brush body until the brush body either breaks or reaches a bend angle of 90°. The distance the grip of the Instron test apparatus travels in the vertical direction to achieve a 90° bend in the brush body is read from the display of the Instron test apparatus and is recorded as the maximum displacement (in).

Maximum Load

The maximum load exerted on the brush body when bent to 90° (i.e., when maximum displacement is achieved) is read from the display of the Instron test apparatus and recorded. This value is recorded as the maximum load (lbs). If the body breaks prior to bending 90°, the fact of breakage is recorded.

Break

Break is assessed by observing whether or not the brush body breaks during the Maximum Displacement Test.

Energy to Break

Energy to break ($E_b$) of the brush body in the forward and reverse direction is determined by calculating the area under the force vs. displacement curve. The energy to break is read from the display of the Instron test apparatus and is recorded in lbs-in.

Toughness

Toughness (T) of the brush body in the forward and reverse direction is calculated by dividing the energy to break ($E_b$) by the volume of the specimen according to the following equation $$T = E_b/(L*b*a)$$

where $E_b$ is the energy to break, L is the gauge length, a is the width of the specimen, and b is the thickness of the specimen.

Toughness is recorded in in-lbs/in$^2$.

Polymer Composition Preparation

Example 1

Fina 3824 controlled rheology polypropylene (FINA-PP) (Fina Oil & Chemical Co.) having a melt flow rate of 30 g/10 min and a tensile strength of 4700 psi, and ethylene-based plastomer (EXXON-PP1) (Exxon Chemical) having a melt flow rate of 5.2 g/10 min and a tensile strength of 1700 were mixed together at a temperature of 400° F. to form a polymer composition that included 80% by weight FINA-PP and 20% EXXON-PP1.

Example 2

A polymer composition was prepared according to Example 1 with the exception that the ratio FINA-PP/EXXON-PP1 was 75/25.

Example 3

FINA-PP and EXACT 4033 ethylene-based plastomer (EXACT 4033) (Exxon Chemical) having a melt flow rate of 1.3 g/10 min and a tensile strength of 2500 were mixed together to form a polymer composition that included 85% by weight FINA-PP and 15% by weight EXACT 4033.

Examples 4–8

A polymer composition was prepared according to Example 3 with the exception that the FINA-PP/EXACT 4033 ratio was as follows: 80/20 (Example 4); 75/25 (Example 5); 85/15 (Example 6); 80/20 (Example 7); 75/25 (Example 8).

Example 9

FINA-PP, EXACT 4033, and calcium carbonate, were mixed together to form a polymer composition that included 75% by weight FINA-PP, 15% by weight EXACT 4033, and 10% by weight calcium carbonate.

Example 10

FINA-PP and FLEXOMER POLYOLEFIN DFDB-1085 Natural polyolefin (FLEXOMER) (Union Carbide) having a melt flow rate of 5 g/10 min, and a tensile strength of 3000, were mixed together to form a polymer composition that included 85% by weight FINA-PP and 15% by weight FLEXOMER.

Example 11

A polymer composition was prepared according to Example 10 with the exception that the ratio of FINA-PP/FLEXOMER was 75/25.

The polymer compositions of Examples 1–11 were injection molded into a into a mold cavity at 200° C. The mold cavity defined a toothbrush body having a thumb grip having a cross-sectional area of 1 cm$^2$. A reciprocating screw injection molding machine having a shot capacity of 150 grams injected the materials at temperatures between 190° C. and 250° C.

Each of the molded toothbrush bodies was then tested, in the forward and reverse directions where appropriate, according to the Maximum Displacement Test Method. Maximum Load, Energy to Break, and Toughness were also calculated. It was also noted if breakage occurred during the Maximum Displacement test method. Toothbrush bodies that broke are identified with a "yes", and those toothbrush bodies that did not break are identified with a "No".

The results are reported in Table 1.

TABLE 1

| Example | Composition % by weight | Break Forward | Break Reverse | Tensile Strength | Max Load (lbs) (Forward) | Max Load (lbs) (Reverse) | Max Displacement (in) (Forward) | Max Displacement (in) (Reverse) | Energy to break (lbs-in) (Forward) | Energy to break (lbs-in) (Reverse) | Toughness (in-lbs/in$^3$) (Forward) | Toughness (in-lbs/in$^3$) (Reverse) |
|---|---|---|---|---|---|---|---|---|---|---|---|---|
| 1 | 80$^1$/20$^2$ | No | No | 3687 | 9.800 | 8.972 | 3.055 | 3.054 | 21.551 | 22.942 | 41.332 | 44.000 |
| 2 | 75$^1$/25$^2$ | No | No | 3567 | 10.604 | 10.242 | 3.055 | 3.054 | 22.364 | 25.160 | 46.107 | 51.872 |
| 3 | 85$^1$/15$^3$ | No | No | 3800 | 11.243 | 10.368 | 3.055 | 3.055 | 27.042 | 28.427 | 55.752 | 58.607 |
| 4 | 80$^1$/20$^3$ | No | No | 3484 | 10.121 | 9.433 | 3.055 | 3.054 | 21.953 | 23.255 | 45.260 | 47.945 |
| 5 | 75$^1$/25$^3$ | No | No | 3324 | 9.577 | 8.826 | 3.055 | 3.054 | 22.923 | 23.807 | 47.260 | 49.082 |
| 6 | 85$^1$/15$^3$ | No | No | 3271 | 10.528 | 9.704 | 3.055 | 3.054 | 24.797 | 26.274 | 51.124 | 54.169 |
| 7 | 80$^1$/20$^3$ | No | No | 3133 | 9.831 | 9.124 | 3.054 | 3.054 | 23.217 | 24.583 | 47.866 | 50.683 |
| 8 | 75$^1$/25$^3$ | No | No | 2878 | 9.248 | 8.452 | 3.054 | 3.054 | 21.770 | 22.665 | 44.882 | 46.727 |
| 9 | 75$^1$/15$^{3/10 4}$ | No | No | 3611 | 10.348 | 9.717 | 3.054 | 3.055 | 22.607 | 24.119 | 46.609 | 49.726 |
| 10 | 85$^1$/15$^3$ | No | No | 3494 | 11.491 | 9.539 | 3.055 | 2.794 | 23.375 | 27.177 | 58.501 | 56.031 |
| 11 | 75$^1$/25$^3$ | No | No | 3123 | 9.574 | 9.493 | 3.055 | 3.055 | 23.308 | 23.466 | 48.054 | 48.380 |

$^1$ = Fina polypropylene
$^2$ = Exxon-PP1 polypropylene
$^3$ = Exact 4033 polypropylene
$^4$ = Calcium carbonate
$^5$ = Flexomer Other embodiments are within the claims.

What is claimed is:

1. An oral brush comprising:
a body comprising a polymer composition that comprises polypropylene and a plastomer, said polymer composition comprising from about 2% by weight to about 30% by weight plastomer, said polymer composition having a melt flow rate of at least about 10 g/10 min; and
bristles extending from said body.

2. The oral brush of claim 1, wherein said body has a tensile strength of at least about 3100 psi.

3. The oral brush of claim 1, wherein said body has a tensile strength of at least about 3700 psi.

4. The oral brush of claim 1, wherein said body has a tensile strength of from about 3700 psi to about 6,000 psi.

5. The oral brush of claim 1, wherein said body defines a shape comprising a handle and a head extending from said handle, said handle comprising a thumb grip having a cross-sectional area no greater than about 1.8 cm$^2$.

6. The oral brush of claim 1, wherein said body defines a shape comprising a handle and a head extending from said handle, said handle having a cross-sectional area no greater than about 1 cm$^2$.

7. The oral brush of claim 1, wherein said polymer composition has a melt flow rate of from about 10 g/10 min to about 40 g/10 min.

8. The oral brush of claim 1, wherein said polymer composition has a melt flow rate of from about 15 g/10 min. to about 30 g/10 min.

9. The oral brush of claim 1, wherein said polypropylene has a melt flow rate of in the range of from about 30 g/10 min to about 40 g/10 min.

10. The oral brush of claim 1, wherein said polypropylene has a tensile strength of from about 4000 psi to about 6000 psi.

11. The oral brush of claim 1, wherein said plastomer has a melt flow rate of from about 1.3 g/10 min to about 5.2 g/10 min.

12. The oral brush of claim 1, wherein said plastomer has a has a tensile strength of from about 1500 to about 3000 psi.

13. The oral brush of claim 1, wherein said plastomer comprises a copolymer comprising ethylene and a polyalpha-olefin.

14. The oral brush of claim 1, wherein said polymer composition comprises from about 10% by weight to about 20% by weight plastomer.

15. The oral brush of claim 1, wherein said polymer composition comprises from about 75% by weight to about 0% by weight of said polypropylene; and from about 10% by weight to about 25% by weight of said plastomer.

* * * * *